United States Patent

[11] 3,610,224

| [72] | Inventor | John T. Marshall<br>2484 Worcester Road, Orchard Lake,<br>Mich. 48033 |
|---|---|---|
| [21] | Appl. No. | 826,606 |
| [22] | Filed | May 21, 1969 |
| [45] | Patented | Oct. 5, 1971 |

[54] PORTABLE GRILL
1 Claim, 5 Drawing Figs.

[52] U.S. Cl. .................................................. 126/9 R,
126/304 R, 248/188.6, 248/439
[51] Int. Cl. .......................................... F24b 3/00,
F24c 1/16
[50] Field of Search ............................................ 126/9, 9 B,
25, 25 A, 38, 304, 306; 248/166, 188.6, 439;
108/125, 129

[56] References Cited
UNITED STATES PATENTS

| 2,556,365 | 6/1951 | McKnight, Jr. ................ | 126/9 |
| 2,780,215 | 2/1957 | Vacanti, Jr. ................... | 126/9 |

FOREIGN PATENTS

| 1,246,190 | 8/1967 | Germany ..................... | 248/188.6 |

*Primary Examiner*—Charles J. Myhre
*Attorney*—James L. O'Brien

ABSTRACT: A hinge having a U-shaped spring for holding the legs of a portable grill or the like in both the extended and folded positions.

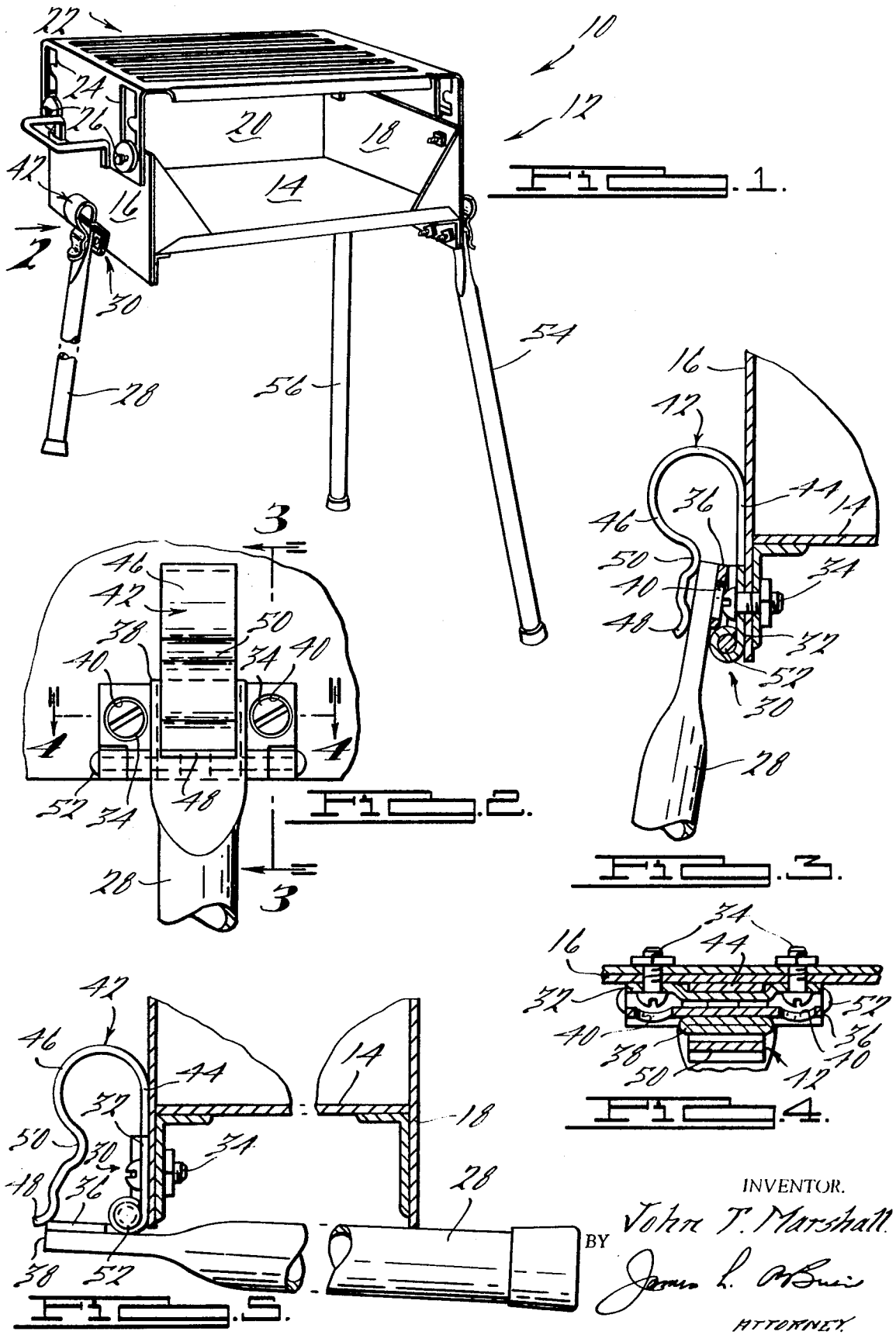

PORTABLE GRILL

A hinge having a U-shaped spring for holding the legs of a portable grill or the like in both the extended and folded positions.

The present invention relates to an improvement in hinges particularly but not exclusively useful for folding legs of portable cooking grills which may be shipped in knocked-down form and assembled by an unskilled person and which provides a simple, reliable and relatively inexpensive means for holding the legs of a grill or the like in both the extended and folded positions.

Additional objects and advantages of the present invention will be readily apparent to one skilled in the art from the following description of a preferred embodiment taken in connection with the appended drawings in which:

FIG. 1 is a perspective view of a portable grill with a hinge embodying the present invention;

FIG. 2 is an enlarged end view of the hinge and a portion of the grill shown in FIG. 1;

FIG. 3 is a sectional view taken along line 3—3 of FIG. 2;

FIG. 4 is a sectional view taken along line 4—4 of FIG. 2; and

FIG. 5 is a view similar to FIG. 3 but showing the leg in the folded position.

Referring now to the drawings and more particularly to FIG. 1, numeral 10 designates a portable grill having a base number 12 with bottom 14, sides 16 and 18 and back 20. An adjustable grill number 22 is adjustably mounted on base number 12 by means of slots 24 and bolts 26.

Folding leg 28 is pivotally secured to side 16 of base number 12 by means of a hinge 30 having a first plate 32 fastened to side 16 by means of bolts 34 and a second plate 36 secured to leg 28 as by welding. Leg 28 is of tubular construction and has a generally circular cross section except at its upper or projecting end 38 where it is flattened near hinge 30. Second plate 36 is provided with enlarged openings 40 through which bolts 34 pass in coming into engagement with first plate 32.

A U-shaped spring 42 is provided with a leg 44 which is mounted between first hinge plate 32 and side 16 and held secured therebetween by tightening bolts 34. The other leg 46 of spring 42 is formed with a turned-up end 48 and an intermediate bend 50. End 48 and bend 50 are adapted to engage the upper or projecting end 38 of leg 28 above the pivot pin 52 of hinge 30 to urge the upper end of leg 28 toward side 16 and hold the leg in its extended position. Upon application of a predetermined force leg 28 may be moved toward folded position causing leg 46 of spring 42 to yield to permit the end 38 of leg 28 to move from the position shown in FIG. 1 to the position shown in FIG. 5 wherein the end 48 of spring leg 46 is in engagement with the end 38 to resiliently hold leg 28 in the folded position.

A pair of legs 54 and 56 similar in construction to leg 28 are secured to side 18 of base number 12 by hinges and springs similar to hinge 30 and spring 42.

Although only one embodiment of the present invention has been shown and described in detail, it will be readily apparent to those skilled in the art that various changes and modifications could be made without departing from the spirit of the invention.

I claim:

1. In a portable grill having a base member with a folding leg secured thereto by a hinge, the improvement comprising: a hinge pin secured to said base member, a hinge plate pivotally mounted on said pin, means for securing said plate to said leg with an upper portion of said leg extending beyond the hinge pin, said hinge plate being rotatable from a leg-extended position wherein said hinge plate is in nonyielding abutment with said base member to a leg-folded position, and a substantially U-shaped spring having one end secured to said base member and having its other end free to selectively engage the upper portion of said leg in a first position when said leg is in the extended position to urge said upper potion in a direction toward engagement with said base member and being outwardly yieldable to accommodate rotation of said leg to the folded position wherein the free end of said spring in a second position engages the upper portion of said leg to urge said leg in a direction opposite to the first-mentioned direction.